Patented Aug. 7, 1934

1,969,694

UNITED STATES PATENT OFFICE 1,969,694

PROCESS OF REFINING OILS

Frank W. Hall, Port Arthur, Tex., assignor to The Texas Company, New York, N. Y., a corporation of Delaware No Drawing. Application September 24, 1930, Serial No. 484,243

3 Claims. (Cl. 196—41)

This invention relates to the art of refining oils and the like and has to do particularly with the refining of cracked distillates to render them suitable for marketing and to recover certain by-products in an economical manner.

It is customary in the refining of cracked distillates in order to improve the color, odor, or to remove gum forming constitutents, to treat the raw distillate with an acid, usually sulphuric acid. The acid oil after removing the sludge, is then neutralized with an alkali and the neutral oil sweetened with sodium plumbite or other sweetening agent.

The neutralizing treatment of the acid oil with alkali not only removes excess mineral acid remaining after the acid treatment, but also reacts with organic acids and carries them out in the spent neutralizer.

In general, heretofore, the neutralization of acid treated oils has been done in a single step, i. e., sufficient alkali is added to neutralize all the acid constituents present and the neutralization products which for the most part are water soluble accumulated as a complex mixture. As a result, when by-products such as organic acids, are attempted to be separated from the mixture, there is a contamination by other undesirable neutralization products and purification in an economical manner is often impossible.

My invention comprises particularly an improved method of neutralizing acid treated oils in such a way that the organic acid neutralization products from which it is desirable to recover by-products, such as phenols, are separated and concentrated into an alkali liquor which is free from the mineral acid neutralization products and other undesirable material removed during the stage of mineral acid neutralization.

In accordance with my invention, the acid oil is preferably neutralized in two separate stages. In the first stage the strong or mineral acids, and in the second stage the weak or organic acids are removed. By this method also advantage may be taken of the nature of the acids by using neutralizing agents which are most economical for the particular type of acidity.

It has been found that a relatively cheap neutralizing agent, such as calcium carbonate or its equivalent, is satisfactory to neutralize the mineral acids, while a stronger alkali such as caustic soda or its equivalent is desirable for extracting organic acids. It is apparent, therefore, that not only is a saving in cost of neutralizing agents possible and more precise control of the neutralizing operation obtainable, but also the organic acids are concentrated in a separate fraction, viz: the caustic soda liquor, which facilitates the separation of by-products therefrom.

One method of carrying out my invention, illustrating its application to the treatment of cracked naphtha, is as follows:

The untreated naphtha is charged to an agitator, preferably of the continuous type, where it is brought into intimate contact with 2 to 6 lbs. of sulphuric acid per barrel of oil. A reaction takes place between the acid and certain undesirable constituents of the oil resulting in the formation of an acid sludge which is settled for a short time and drawn off.

The acid oil after the removal of the sludge still contains considerable mineral acid which does not readily settle from the treated oil. To neutralize the mineral acidity, the acid naphtha is delivered to another agitator where it is contacted with an alkali material termed a mineral acid neutralizer. In practice, this neutralizer may consist of a suspension or a solution of a weak alkali or alkaline earth carbonates which will react with the mineral acids without material reaction with the organic acidity. The mineral acid neutralizer removes, in the form of salts or sludge, substantially all the mineral acid. After settling, the spent mineral acid neutralizer is drawn off and used for neutralizing another batch of oil or stored for other means of disposal.

The partially neutralized naphtha, at this point, still retains its organic acidity, consisting chiefly of phenolic bodies, which often occur in substantial quantities in cracked distillates. The naphtha is next thoroughly scrubbed with a comparatively strong alkali, preferably caustic soda. The organic acids are converted into salts, such as phenolates, which are soluble in the aqueous alkaline solution and with a relatively strong alkaline solution, for example, 10 to 30 Baumé, are completely removed leaving the oil entirely neutral.

The neutral naphtha, after settling the caustic solution, is passed into a final agitator for sweetening. In this agitator the oil is treated with sodium plumbite, commonly called "doctor" solution, or other suitable sweetening agent. The finished product from the sweetening agitator is then ready for market or storage.

The spent alkali from the organic acid neutralizing stage, substantially free from mineral acid neutralization products and sludge materials removed in the initial stages of neutralization, contains chiefly organic acid salts. When large quantities of these salts are present the solution assumes a yellowish to brown color and on acidifying liberates an oily liquid having a strong odor of cresylic acids. The alkaline salt solution, which contains relatively pure organic acids, is delivered to a by-product recovery plant where valuable products may be economically recovered. The particular methods of removing the acids from the spent neutralizer form no part of this invention and are not described in detail here.

It will be apparent to those skilled in the art that various modifications of my process are possible. For example, it may be desirable to use more than two stages of neutralization. Likewise, I do not desire to limit myself to the particular neutralizing agents specified.

While I have described a particular method of carrying out the invention, other modifications may be made without departing from the spirit of the invention, and I therefore desire to cover all such modifications as fall within the scope of my invention, which is set forth in the appended claims.

I claim:

1. In the art of refining cracked naphtha, the step of neutralizing a sulfonic acid treated oil to recover the organic acids and phenolic bodies which comprises first neutralizing and removing the mineral acid acidity with an alkaline earth carbonate and then neutralizing and extracting the organic acids and phenolic bodies with a caustic alkali.

2. The method of neutralizing sulfuric acid treated cracked naphtha to separate and recover the organic acids and phenolic bodies which comprises first neutralizing and separating the mineral acid acidity with aqueous calcium carbonate and then neutralizing and extracting the organic acids and phenols with aqueous caustic soda.

3. The method of refining cracked petroleum distillates, such as cracked naphtha and the like, containing organic acid bodies of the nature of complex phenolic compounds, comprising the steps of treating the distillate with sulfuric acid, separating the sludge so formed from an acid oil, neutralizing the acid oil in a two stage operation in which the inorganic acids are neutralized and separated in the first stage by washing the oil with an aqueous suspension of an alkaline earth carbonate and the organic acids are extracted in the second stage by washing the partially neutralized oil with an aqueous solution of caustic alkali of about 10°–30° Baumé, and separating from the said second stage an alkaline neutralization product suitable for the recovery of petroleum phenolic bodies therefrom.

FRANK W. HALL.

CERTIFICATE OF CORRECTION.

Patent No. 1,969,694.                                                August 7, 1934.

FRANK W. HALL.

It is hereby certified that error appears in the printed specification of the above numbered patent requiring correction as follows: Page 2, line 28, claim 1, for "sulfonic" read sulfuric; and that the said Letters Patent should be read with this correction therein that the same may conform to the record of the case in the Patent Office.

Signed and sealed this 16th day of October, A. D. 1934.

Leslie Frazer
Acting Commissioner of Patents.

(Seal)